Patented Sept. 23, 1952

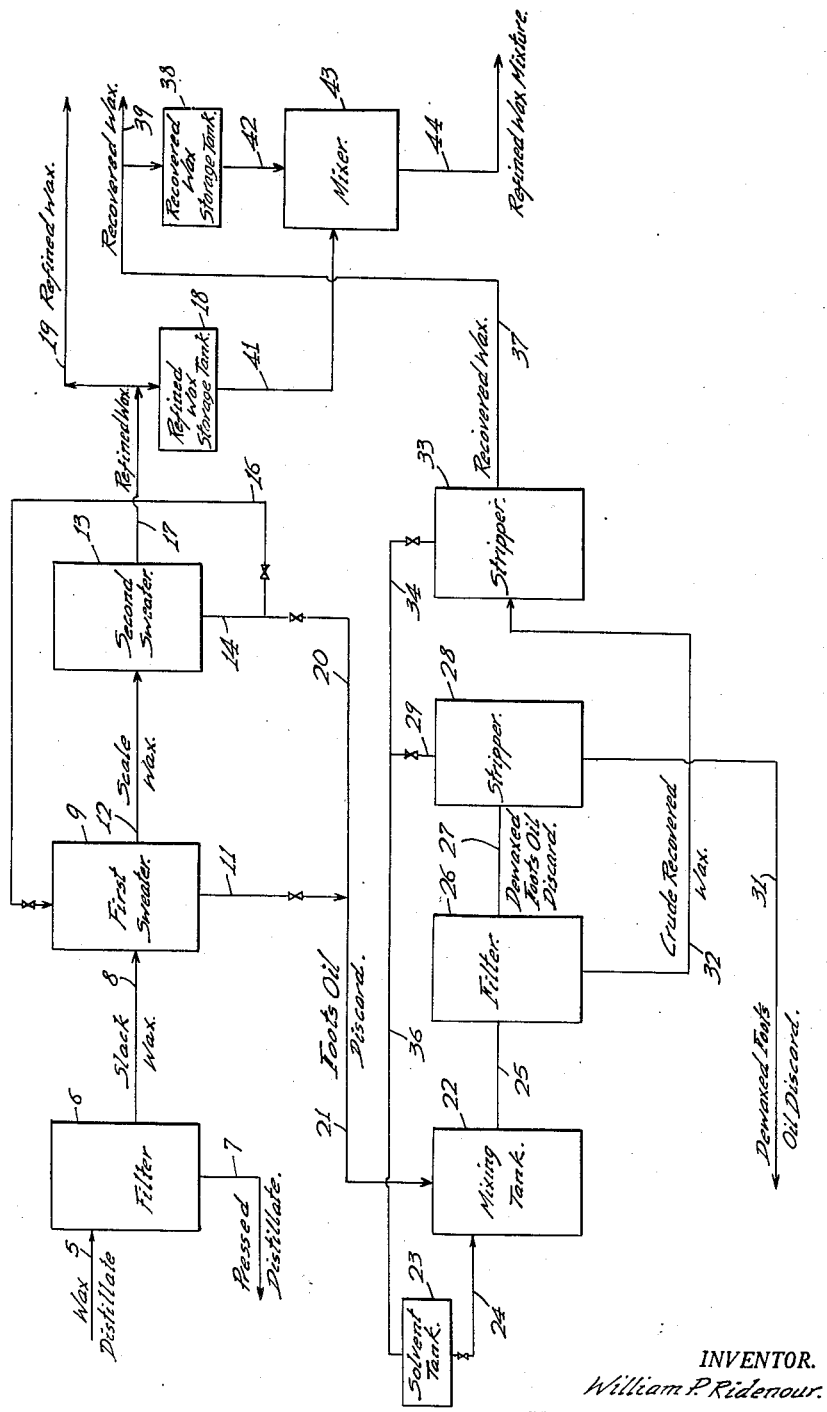

2,611,734

UNITED STATES PATENT OFFICE 2,611,734

WAX PRODUCTION PROCESS

William P. Ridenour, Pittsburgh, Pa., assignor to Gulf Research & Development Company, Pittsburgh, Pa., a corporation of Delaware Application June 29, 1950, Serial No. 171,072

4 Claims. (Cl. 196—20)

This invention relates to a process for producing mixtures of paraffin waxes having desirable physical properties and more particularly, to a process for producing excellent yields of mixtures of paraffin waxes with high tensile strengths and high melting points from paraffin or wax distillates.

A refined paraffin wax with a high melting point and high tensile strength obtained by sweating scale wax is desirable for many commercial uses, not only because of these properties but also because high hardness, high gloss and other desirable properties are usually associated with a high melting point and high tensile strength. In the past, refined paraffin wax has been produced from slack wax separated from a fraction or cut of petroleum known as a wax or paraffin distillate which boils in the range of from about 300° to about 600° F. at about 10 mm. of mercury absolute pressure. The slack wax is separated from the petroleum distillate by chilling the distillate and removing the solid wax or slack wax formed at the separation temperature by pressing or filtering under pressure. The liquid phase, which is known as pressed distillate, is processed further to obtain lubricating oil. The slack wax is then sweat to produce scale wax and foots oil. The scale wax is in turn, sweat one or more times to remove oil and soft waxes with low melting points and low tensile strengths from the scale wax, thereby producing sweat oil which can be recycled and a refined wax with a high melting point and high tensile strength. The foots oil and the sweat oil which is not recycled are then used separately or combined as foots oil discard. The production of refined paraffin waxes with the desired properties has therefore been limited heretofore by the amount of scale wax which is available.

I have discovered that a high yield of refined paraffin wax with a high melting point and high tensile strength is obtained by carrying out a process comprising sweating slack wax and then the scale wax to produce refined wax and foots oil discard, the refined wax having a high melting point and high tensile strength, solvent dewaxing the foots oil discard, separating a crude recovered wax which is insoluble at a separation temperature from about 60° to about 100° F. and preferably from about 65° to about 75° F., removing the solvent from the wax to obtain recovered wax which has a high melting point of at least about 115° F. and preferably from about 120° to 130° F. and a fairly high tensile strength of at least about 100 pounds per square inch and preferably at least about 120 pounds per square inch.

I have found that recovered wax can be mixed with the refined wax to form a mixture or blend of refined waxes with a melting point and tensile strength substantially equal to the melting point and tensile strength of the refined wax. As pointed out in detail below, the amount of recovered wax which can be blended with the refined wax does not depend upon the melting point and tensile strength of the refined wax. Instead, unexpectedly, I have found that wax recovered in accordance with the process of my invention, having a melting point of at least about 115° F., and preferably at least about 120° F., and a tensile strength of at least about 100 pounds per square inch, and preferably at least about 120 pounds per square inch, can be blended with a refined wax having a melting point of at least about 115° F., and preferably from about 120° to about 130° F., and a tensile strength of at least about 150 pounds per square inch, and preferably from about 175 pounds per square inch to about 400 pounds per square inch, or higher, to form a mixture or blend containing no more than 5 weight per cent of the recovered wax and having a melting point and tensile strength substantially equal to the melting point and tensile strength of the refined wax. Because of economic considerations, the maximum amount of recovered wax which can be added without affecting the melting point and tensile strength will usually be employed. Therefore, preferred results are obtained when the mixture contains about 5 weight per cent recovered wax.

It is necessary to employ a recovered wax with the properties described above for blending with a refined wax to produce a mixture of refined waxes with a melting point and tensile strength substantially equal to the melting point and tensile strength of the refined wax, because when an appreciable amount of a recovered wax with a melting point less than about 115° F. and a tensile strength less than about 100 pounds per square inch is blended with a refined wax, the melting point and tensile strength of the mixture are considerably decreased. Although a recovered wax with a melting point higher than 130° F. can be employed for blending with refined wax to form a mixture containing somewhat more than 5 weight per cent recovered wax and still have a melting point and tensile strength substantially equal to the melting point and tensile strength of the refined wax, such a recovered wax is usually not available in quantity for blending because for enonomic reasons most of the waxes melting above 130° F. are retained in the wax cake and are not separated.

Although it is necessary to adjust the separation temperature somewhat depending upon the foots oil discard which is being solvent dewaxed and upon the solvent, this adjustment can be made and the separation temperature selected based upon the yield and properties of the recovered wax which are desired. In general, as the temperature of separation is increased, the melting point and tensile strength of the crude recovered wax produced are increased while the yield of crude recovered wax is decreased. As pointed out above, separation temperatures in the range of about 60° to about 100° F. can be employed. Preferred results are obtained with a separation temperature in the range of about 65° to about 75° F. and especially preferred results are obtained with a temperature of about 70° F. With this range of separation temperatures, and particularly with a temperature of about 70° F., excellent yields of recovered wax having a melting point of from about 120° to about 130° F. and a tensile strength of at least about 120 pounds per square inch are produced. In addition, from 65° to 75° F. is the usual range of room temperature and therefore when operating in this range the advantages of operating at room temperature are obtained.

Although other solvents can be employed which when combined with the oil in foots oil discard dissolve all of the wax present therein and form a solution from which the wax precipitates on cooling, preferred results are obtained with methyl ethyl ketone and for this reason the following description will largely be concerned with a process in which the solvent is methyl ethyl ketone.

The process can best be illustrated by describing a presently preferred embodiment in conjunction with the accompanying figure hereby made a part of this specification. The figure shows a simplified plant layout in accordance with my invention.

The process comprises introducing wax distillate by means of line 5 to the filter 6. The temperature within the filter is adjusted in the range of 0° to 35° F. After filtering, the pressed distillate is removed by line 7 and the slack wax is liquefied and removed through line 8, to the first sweater 9. In the sweater the temperature is gradually increased at the rate of about 1.5° F. per hour until a desired temperature, usually about 132° F., is obtained. Foots oil is removed from the sweater by means of valved line 11. The scale wax which is produced is liquefied and transferred through line 12 to the second sweater 13. During the second sweating the sweat oil is removed by line 14 and a portion is recycled to the first sweater 9 by valved line 16. The refined wax is liquefied and removed from the second sweater through line 17 and is passed to the refined wax storage tank 18 or is removed by line 19. A portion of the sweat oil removed by line 14 is not recycled but instead is passed into valved line 20 and is combined with the foots oil from valved line 11 to form foots oil discard containing a major proportion of foots oil in line 21. The foots oil discard is introduced at a temperature of about 125° F. into the mixing tank 22 and methyl ethyl ketone at a temperature of about 120° F. is introduced from the solvent tank 23 into the same mixing tank by means of valved line 24 until about 3 volumes of methyl ethyl ketone per volume of foots oil discard have been added. The mixture is agitated until all of the wax in the foots oil discard has been dissolved and a solution has been formed, which usually requires 5 to 30 minutes. The solution is cooled to a temperature of about 70° F., passed by line 25 to filter 26 where the liquid phase containing dewaxed foots oil discard is separated from the solid phase containing crude recovered wax. The liquid phase is removed by line 27 to stripper 28.

The methyl ethyl ketone is removed from the stripper and is passed overhead in valved line 29; and the dewaxed foots oil discard is removed by line 31. The crude recovered wax is removed from the filter 26 by means of line 32 and is introduced to stripper 33. In the stripper, methyl ethyl ketone is removed overhead by valved line 34. The methyl ethyl ketone from the two strippers in lines 29 and 34 is combined in line 36 and is returned to the solvent tank from which it is recycled to the mixing tank. Recovered wax is removed from stripper 33 by means of line 37 and passed to the recovered wax storage tank 38 or is removed by line 39. Refined wax from the tank 18 and recovered wax from the tank 38 are transferred by lines 41 and 42 to a mixer 43. The rate of flow of material through each of these lines is adjusted to produce a mixture of refined wax containing a predetermined weight per cent of recovered wax. The refined wax mixture or blend is removed from the mixer 43 by line 44.

When operating as described with a separation temperature of about 70° F., a yield of about 17.8 per cent recovered wax was obtained in a typical operation of the process. The recovered wax had a melting point of about 123.1° F. determined by a modified ASTM D87–42 test in which the modification consists of using a .4 gram sample instead of a 16 gram sample, and using an Anschütz thermometer. The molecular weight of the recovered wax was about 350. The tensile strength was 140±20 pounds per square inch determined on an approximately 0.25 square inch blank with an Amthor tester and the penetration was 22.4 for five seconds at 150 grams and 27.2 for five seconds at 200 grams determined by the ASTM D5–25 test method. The refined wax had a melting point of about 131° F. and a tensile strength of 363.2±5.6 pounds per square inch, the properties being determined in the same manner as for the recovered wax.

As stated above, I have found that the recovered wax can be mixed or blended with refined wax to obtain a mixture or blend containing as much as 5 per cent recovered wax, the resulting mixture or blend having a melting point and tensile strength substantially equal to those of the original refined wax. This is illustrated in the table which shows the results obtained by blending various amounts of the recovered wax and the refined wax produced as described above which is identified as wax A, and the results of blending the recovered wax with a refined wax identified as wax B which has a melting point and tensile strength as stated. The melting points and tensile strengths were determined as described before for the recovered wax.

*Table*

| Wax or Wax Blend | | Melting Point ° F. | Tensile Strength Pounds per Square Inch |
|---|---|---|---|
| Refined Wax Percent | Recovered Wax Percent | | |
| Wax A: | | | |
| 100 | 0 | 131.0 | 363.2± 5.6 |
| 95 | 5 | 131.0 | 366.8± 5.2 |
| 90 | 10 | 131.0 | 330.4± 4.4 |
| 0 | 100 | 123.1 | 140 ±20 |
| Wax B: | | | |
| 100 | 0 | 122.4 | 210.4± 6.8 |
| 98 | 2 | (1) | 216 ±12 |
| 95 | 5 | 122.6 | 202.4±10.8 |
| 90 | 10 | 122.6 | 128.8± 7.6 |
| 0 | 100 | 123.1 | 140 ±20 |

[1] Erratic results.

From the table it can be seen that with the refined wax having a melting point of about 131° F. and a tensile strength of about 363 pounds per square inch, as much as 5 per cent recovered wax with a melting point of about 123° F. and a tensile strength of at least about 120 pounds per square inch can be added without a substantial reduction in the melting point and tensile strength of the mixture of refined waxes. In like manner the data of the table indicate that when a refined wax with a lower melting point and much lower tensile strength is employed, again as much as 5 per cent recovered wax can be blended with it to obtain a mixture with a melting point and tensile strength substantially equal to the melting point and tensile strength of the refined wax. As pointed out above, other refined waxes and other recovered waxes can be employed and blended to form a mixture containing no more than 5 weight per cent recovered wax, and under these conditions when operating in accordance with my invention the mixture of refined wax and recovered wax will have a melting point and tensile strength substantially equal to that of the refined wax.

The mixtures or blends of refined waxes produced in accordance with my invention can be further processed if desired. For example, they can be washed, treated with surfuric acid and percolated through bone char or other absorbents to obtain a clear final product.

As stated previously, solvents other than methyl ethyl ketone can be employed which when combined with the oil contained in foots oil discard produce a solution in which at a lower temperature the wax is less soluble than in the oil alone. For example, a solvent such as chlorex ($\beta$-$\beta$'-dichlordiethyl ether) or a mixture of solvents such as methyl ethyl ketone and benzene, methyl ethyl ketone, benzene, and toluene, and acetone and benzene can be used.

Obviously many modifications and variations of the invention, as hereinbefore set forth, can be made without departing from the spirit or scope thereof and therefore only such limitations should be imposed as are indicated in the appended claims.

I claim:

1. A process of preparing a mixture of paraffin waxes having a high melting point and high tensile strength which comprises solvent dewaxing a foots oil discard at a temperature from about 60° to about 100° F. to form a liquid and a solid phase, said solid phase containing crude recovered wax; removing the solvent from the solid phase to obtain a recovered wax having a melting point of at least about 115° F. and a tensile strength of at least about 100 pounds per square inch; and combining the recovered wax with a refined wax having a melting point of at least about 115° F. and a tensile strength of at least about 150 pounds per square inch to form a mixture containing not more than 5 weight per cent recovered wax and having a melting point and a tensile strength substantially equal to the melting point and tensile strength of the refined wax.

2. The process of claim 1 wherein the solvent is methyl ethyl ketone.

3. A process of preparing a mixture of paraffin waxes having a high melting point and high tensile strength which comprises solvent dewaxing a foots oil discard comprising a major proportion of foots oil and a minor proportion of sweat oil with methyl ethyl ketone at a temperature of from about 65° to about 75° F. to form a liquid and a solid phase, said solid phase containing crude recovered wax; removing the methyl ethyl ketone from the solid phase to obtain a recovered wax having a melting point of from about 120° to about 130° F. and a tensile strength of at least about 120 pounds per square inch; and combining the recovered wax with a refined wax having a melting point of from about 120° to about 130° F. and a tensile strength of at least about 175 pounds per square inch to form a mixture containing about 5 weight per cent recovered wax and having a melting point and tensile strength substantially equal to that of the refined wax.

4. A process of preparing a mixture of paraffin waxes having a high melting point and high tensile strength which comprises sweating a slack wax to form foots oil and scale wax; sweating the scale wax at least once to form sweat oil and refined wax, said refined wax having a melting point of from about 120° to about 130° F. and a tensile strength of from about 175 to about 400 pounds per square inch; recycling a substantial portion of the sweat oil to obtain additional wax; combining the foots oil with the remaining sweat oil to form foots oil discard comprising a major proportion of foots oil; solvent dewaxing the foots oil discard with methyl ethyl ketone at a temperature of about 70° F. to form a liquid and a solid phase, said solid phase containing crude recovered wax; removing the methyl ethyl ketone from the solid phase to obtain a recovered wax having a melting point of from about 120° to about 130° F. and a tensile strength of at least about 120 pounds per square inch; and combining the refined wax and the recovered wax to form a mixture containing about 5 weight per cent recovered wax and having a melting point and tensile strength substantially equal to that of the refined wax.

WILLIAM P. RIDENOUR.

REFERENCES CITED

The following references are of record in the file of this patent:

UNITED STATES PATENTS

| Number | Name | Date |
| --- | --- | --- |
| 1,937,518 | Henderson et al. | Dec. 5, 1933 |
| 2,127,668 | Adams et al. | Aug. 23, 1938 |
| 2,229,659 | Carr | Jan. 28, 1941 |
| 2,361,582 | Adams et al. | Oct. 31, 1944 |
| 2,467,959 | Bowman et al. | Apr. 19, 1949 |
| 2,486,014 | Evans | Oct. 25, 1949 |